O. P. Secor,
Hay Fork.
No. 49834.   Patented Seh. 5, 1865.
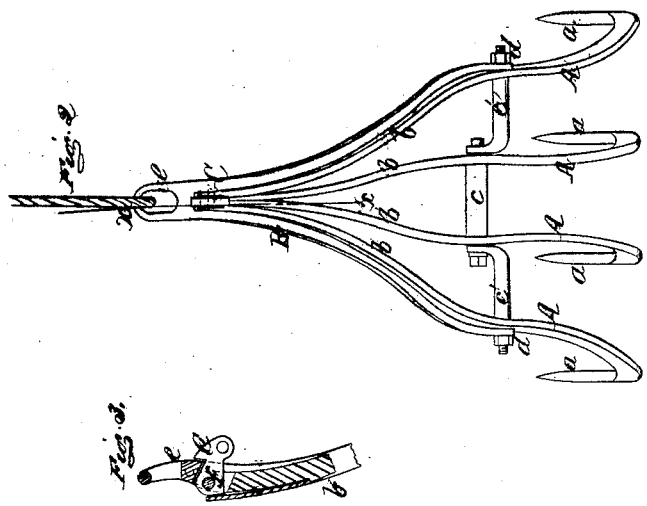
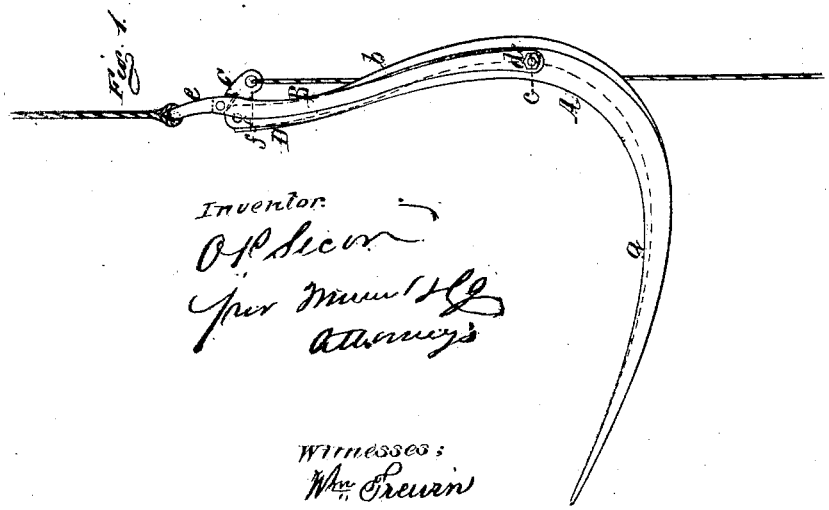
Inventor:
O. P. Secor
Witnesses:

UNITED STATES PATENT OFFICE.

OLIVER P. SECOR, OF CHICAGO, ILLINOIS, ASSIGNOR TO C. L. BELLAMY, OF CATSKILL, NEW YORK.

IMPROVEMENT IN HORSE HAY-FORKS.

Specification forming part of Letters Patent No. 49,834, dated September 5, 1865.

*To all whom it may concern:*

Be it known that I, O. P. SECOR, of Chicago, in the county of Cook and State of Illinois, have invented a new and Improved Horse Hay-Fork; and I do hereby declare that the following is a full, clear, and exact description thereof, which will enable others skilled in the art to make and use the same, reference being had to the accompanying drawings, forming part of this specification, in which—

Figure 1 represents a side view of my invention; Fig. 2, a back view of the same; Fig. 3, a vertical section of the upper part of the same, taken on the line $x\,x$, Fig. 2.

Similar letters of reference indicate like parts.

The fork is constructed of a series of metal bars, A, bent or curved so as to form tines or teeth $a$ and shanks $b$, the latter being bent or curved so that they may be connected together at their upper ends. The bars A gradually spread apart from their upper to their lower ends, so that the tines or teeth $a$ will be at the proper distance from each other to hold a requisite quantity of hay. The tines or teeth are retained at a proper distance apart by cross-bars $c\,c'$, the central one, $c$, serving as a handle.

B represents a bail, the lower ends of which are fitted loosely on the outer ends of the outer cross-bars, $c'$, which pass through the outer or side bars, A, of the fork, the bail being secured on said cross-bars $c\,c'$ by nuts $d$. The bail B is curved corresponding to the curvature of the side bars, A, and it has an eye, $e$, made in its upper end, in which the hoisting-rope is secured.

In the upper part of the fork there is fitted by a pivot, $f$, a catch, C, which has a spring, D, bearing against it, said spring having a tendency to keep the catch engaged with the bail B just below the eye $e$. This catch holds the fork in proper position to admit of the latter being elevated with its load; and when the loaded fork is elevated to the desired height the operator, by pulling a cord attached to the catch C, releases the upper end of the fork from the bail, and the fork tilts under the gravity of its load and the latter is discharged. When the empty fork is lowered the operator pushes the tines or teeth $a$ into the hay by pressing his foot on the central cross-bar, $c$, or by shoving the latter downward with his hand and then engaging the bail B with the upper end of the fork the latter is ready to be again elevated.

The hoisting-rope is arranged and has a horse attached to it in the usual way.

The bail B may be dispensed with, but not the eye $e$. The latter may be attached to the hoisting-rope and the lower end of the rope attached to the central or to the end cross-bars, $c$ or $c'$, the catch C engaging with the lower part of the eye $e$. The bail, however, would be preferable.

I claim as new and desire to secure by Letters Patent—

The tines $a\,a\,a\,a$, each formed in a continuous curve in one piece with its shanks $b$, which shanks converge and are connected together at their upper ends, in the described combination with the cross-bars $c\,c'$, catch C $f$, springs D, and eye $e$, all constructed, arranged, and employed in the manner and for the purposes specified.

OLIVER P. SECOR.

Witnesses:
JAS. G. MACLAY,
J. E. SAWYER.